US008315296B2

(12) United States Patent
Qi et al.

(10) Patent No.: US 8,315,296 B2
(45) Date of Patent: Nov. 20, 2012

(54) METHOD FOR TESTING A RADIO FREQUENCY (RF) RECEIVER AND RELATED METHODS

(75) Inventors: Yihong Qi, St. Agatha (CA); Michael Certain, Kitchener (CA); Perry Jarmuszewski, Waterloo (CA); Qingmai Zhou, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 713 days.

(21) Appl. No.: 11/751,079

(22) Filed: May 21, 2007

(65) Prior Publication Data
US 2008/0291988 A1      Nov. 27, 2008

(51) Int. Cl.
H04B 3/46           (2006.01)
(52) U.S. Cl. ..... 375/227; 375/224; 375/228; 455/67.11; 455/67.13; 455/226.1; 455/226.3; 455/226.4
(58) Field of Classification Search .......... 375/224–228; 455/67.11, 67.12, 67.13, 226.1, 226.3, 226.4
See application file for complete search history.

(56) References Cited

U.S. PATENT DOCUMENTS

| 5,521,904 | A  * | 5/1996  | Eriksson et al. | 370/249 |
| 5,691,988 | A    | 11/1997 | Yamada et al.   | 371/5.1 |
| 6,792,053 | B1   | 9/2004  | Vainio et al.   | 375/341 |
| 7,286,961 | B2 * | 10/2007 | Kildal          | 702/182 |
| 7,349,692 | B2 * | 3/2008  | Ko et al.       | 455/423 |
| 7,596,373 | B2 * | 9/2009  | McGregor et al. | 455/425 |
| 2004/0131121 | A1 | 7/2004 | Dumitras et al. | 375/240.16 |
| 2004/0185786 | A1 * | 9/2004 | Mirbaha et al. | 455/67.11 |

FOREIGN PATENT DOCUMENTS

EP      1126640      8/2001

OTHER PUBLICATIONS

GSM /EDGE Base Station Bit Error Rate Testing with CMU300 Application Note by Rohde & Schwarz document last modified Jan. 15, 2002.*
Chang et al. "Huber's M-estimation in relative GPS positioning: computational aspects", Journal of Geodesy, vol. 79, Aug. 2005.*
Chao et al. "A Simple and Robust Fastica Algorithm Using the Huber M-Estimator Cost Function", ICASSP 2006, May 2006.*
Chang et al. "Huber's M-estimation in relative GPS positioning: computational aspects", Aug. 2005, Journal of Geodesy, vol. 79, p. 351-362.*
Chang et al. "Huber's M-estimation in relative GPS positioning: computational aspects", Aug. 2005, Journal of Geodesy, vol. 79, pp. 352-362.*
"Robust Detection in Digital Communications", Öberg et al., IEEE Transactions on Communications, vol. 43, No. 5, May 1995, pp. 1872-1876.

* cited by examiner

Primary Examiner — Sam K Ahn
Assistant Examiner — Sophia Vlahos
(74) Attorney, Agent, or Firm — Allen, Dyer, Doppelt, Milbrath & Gilchrist, P.A.

(57) ABSTRACT

A method for testing a radio frequency (RF) receiver may include measuring a plurality of bit error levels for the RF receiver at a given RF frequency. The method may further include applying a Huber function to the measured plurality of bit error levels to generate a bit error ratio (BER) estimate for the RF receiver. The method would also include using the BER estimate to generate a sensitivity for the RE receiver.

14 Claims, 7 Drawing Sheets

METHOD FOR TESTING A RADIO FREQUENCY (RF) RECEIVER AND RELATED METHODS

FIELD OF THE INVENTION

The present invention relates to the field of communications systems, and, more particularly, to wireless communications systems and related methods.

BACKGROUND OF THE INVENTION

Radio sensitivity measurement plays an important role in evaluating a radio frequency (RF) radio receiver's ability to detect a weak signal in either a controlled or real application environment. Radio sensitivity and receive antenna gain together determine the total isotropic sensitivity (TIS), which determines the radio downlink performance.

Radio sensitivity is defined as a receiving power level at the input of the radio when the bit error ratio (BER) of the radio reaches its threshold level. For a Global System for Mobile Communications (GSM) system, a BER of 2.44 is the defined threshold BER level. BER measurement accuracy and measurement time can directly affect radio sensitivity measurement accuracy and time.

Figure 9:
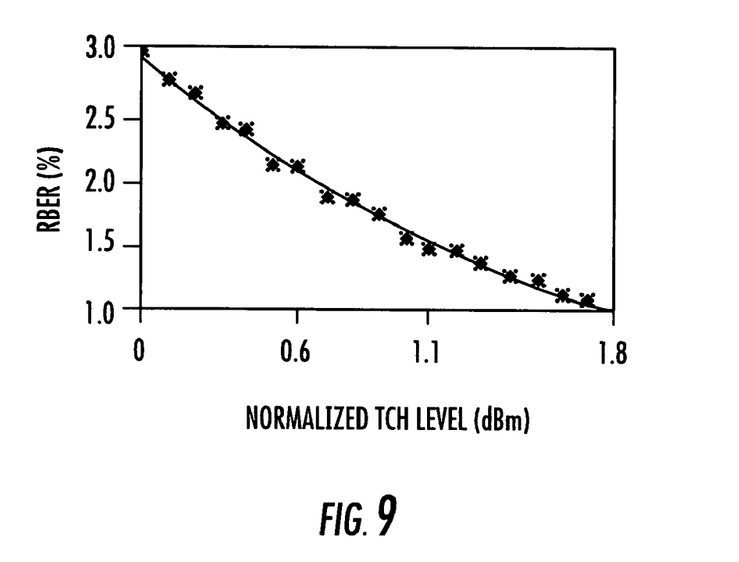
FIG. 9 is a graph of BER vs. normalized TCH level function.

The relationship of BER and sensitivity is shown in the graph of FIG. 9. Since BER fluctuates significantly in real sensitivity measurements, an average value of BER is typically used for estimating the sensitivity of the receiver. Yet, due to large spurious noise in the real communication environment and/or the radio itself, and sudden changes in the test environment, the average BER may even change significantly.

One exemplary approach for estimating a channel bit error ratio in a receiver is set forth in U.S. Pat. No. 6,792,053 to Vainio et al. A pseudo bit error ratio of a channel is determined in a receiver comprising detecting means for detecting a data sequence of a received signal, decoding means for decoding a first encoding of the detected data signal, and re-encoding means for re-encoding with the first encoding the data sequence decoded from the first encoding. The receiver further comprises quality determining means for providing the detected data sequence with a value for quality, and estimating means for estimating the bit error ratio-provided that the quality of the detected data sequence fulfils a predetermined quality requirement by comparing the detected data sequence with the data sequence re-encoded with first encoding.

Despite the existence of such systems, further improvements in determining or estimating BER in communications systems, particularly wireless communications systems, may be desirable.

DETAILED DESCRIPTION OF THE PREFERRED EMBODIMENTS

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a method is disclosed herein for testing a radio frequency (RE) receiver. More particularly, the method may include measuring a plurality of bit error levels for the RF receiver at a given RF frequency, and applying a Huber function to the measured plurality of bit error levels to generate a bit error ratio (BER) estimate for the RF receiver.

The method may also include using the BER estimate to generate a sensitivity for the RF receiver. More particularly, the Huber function may be defined as:

$$\rho_k(f) = \begin{cases} f^2/2 & \text{if } |f| \le k \\ k|f| - k^2/2 & \text{if } |f| < k \end{cases}$$

where k is a positive constant.
Further, k may be defined as:

$$k = 2\sqrt{\frac{\sum_{1}^{n}(x_i - x_0)}{n-1}},$$

where $x_0$ is an initial bit error level and n is a total number of bit error levels. Furthermore, the initial bit error level $x_0$ may be defined as:

$$x_o = \frac{\sum_{i}^{n} x_i}{n}.$$

By way of example, k may be within a range of about 0.8 to 1.4.

Measuring may include measuring the plurality of bit error levels within an anechoic RF chamber. In other embodiments, the measurements may be performed in an outdoor environment. The BER estimate may comprise a residual BER (RBER) estimate, for example. Also by way of example, the RE receiver may be a Global System for Mobile Communications (GSM), General Packet Radio Service (GPRS), and/or an Enhanced Data Rates for Global System for Mobile Communications (GSM) Evolution (EDGE) receiver.

In addition, a test system for testing an RF receiver may include an RF source and a test controller coupled to the RF receiver. More particularly, the test controller may be for measuring a plurality of bit error levels for the RF receiver based upon transmissions from the RF source at a given RF frequency, and applying a Huber function to the measured plurality of bit error levels to generate a BER estimate for the RF receiver.

Figure 1:
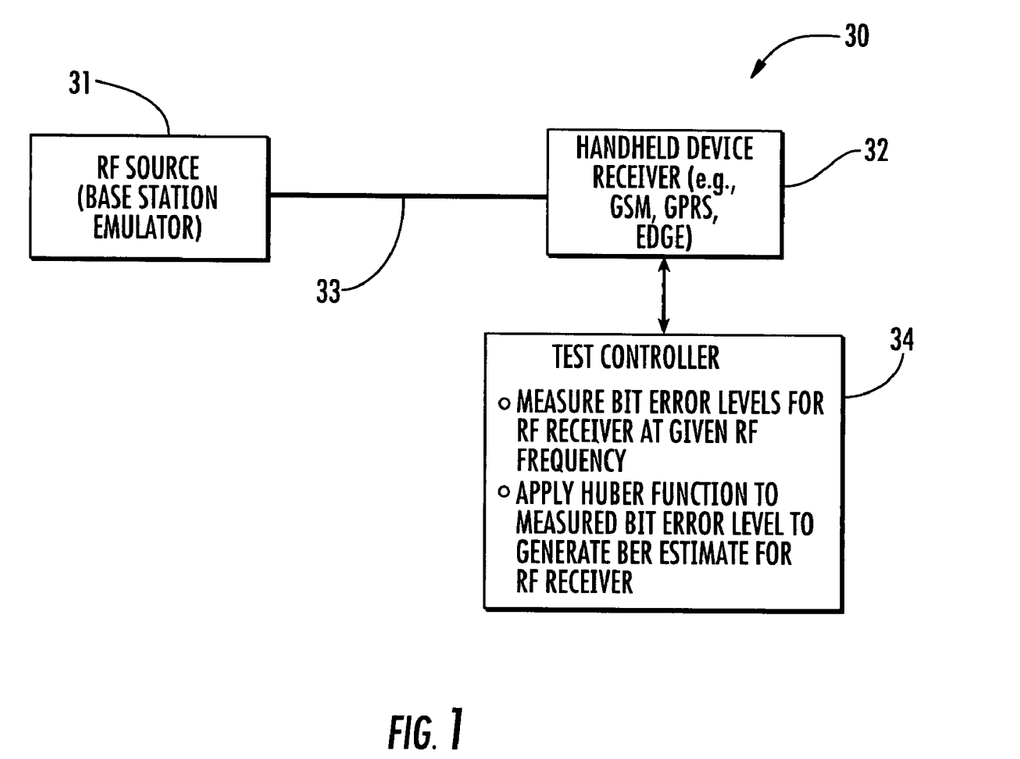
FIG. 1 is a schematic block diagram of an exemplary test system for testing an RF receiver in accordance with one aspect.

Referring initially to FIG. 1, a test system 30 for testing an REF receiver 32, such as a cellular communications receiver, is first described. The system 30 illustratively includes an RE test source 31 coupled to the receiver 32 to be tested via an RE cable 33. By way of example, the device receiver 32 may be a Global System for Mobile Communications (GSM) receiver, a General Packet Radio Service (GPRS) receiver, and/or an Enhanced Data Rates for Global System for Mobile Communications (GSM) Evolution (EDGE) receiver, for example. Of course, other suitable wireless receivers may also be used.

In addition, the RF source 31 may be one of a Rohde and Schwartz universal radio communication tester CMU 200 or an Agilent 8960 base station emulator, for example, although other suitable emulators and/or RF test sources may also be used. A test controller 34 is connected to the device receiver 32 for performing various test operations and measurements, which will be discussed in further detail below. It should be noted that while the RF source 31 and test controller 34 are illustrated as separate components in the FIG. 1, the functions of the RF source and test controller may in fact be performed by the same base station emulator, for example. Alternately, the test controller 34 could be a computer or computing device separate from the RF source 31, as will be appreciated by those skilled in the art.

Figure 2:
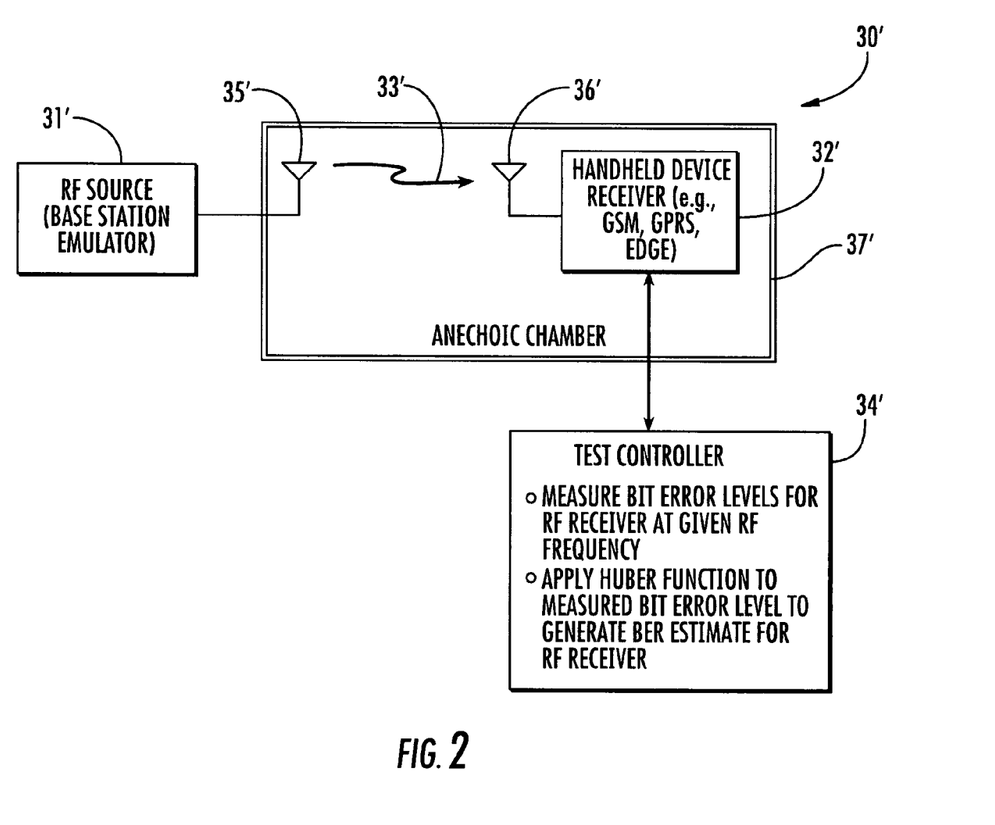
FIG. 2 is a schematic block diagram of an alternative test system for testing an RF receiver.

Turning now to FIG. 2, an alternative test system 30' is now described. The test system 30' includes the RF source 31' (e.g., a base station emulator), an RF controlled enclosed environment, and the wireless handheld device receiver 32'. As will be appreciated by those skilled in the art, an RF controlled enclosed environment is an electromagnetic (EM) wave shield environment, such as the illustrated EM anechoic chamber 37' (which may be a full or semi-anechoic chamber), a shield room or an RP enclosure. An antenna 35' connected to the RF source 31' is positioned within the anechoic chamber 37' and connected to the RF source 31' by a coaxial cable to simulate a base station. An antenna 36' for the device receiver 32' is also positioned within the anechoic chamber 37' and connected to the receiver.

It should be noted that in typical tests the handheld receiver 32' and antenna 36' will be carried by a device housing, but these components may be tested without the device housing if desired. Moreover, the open-air testing need not be performed in the anechoic chamber 37' in all embodiments. That is, these test measurements may be made in an outdoor or actual operating environment.

Figure 3:
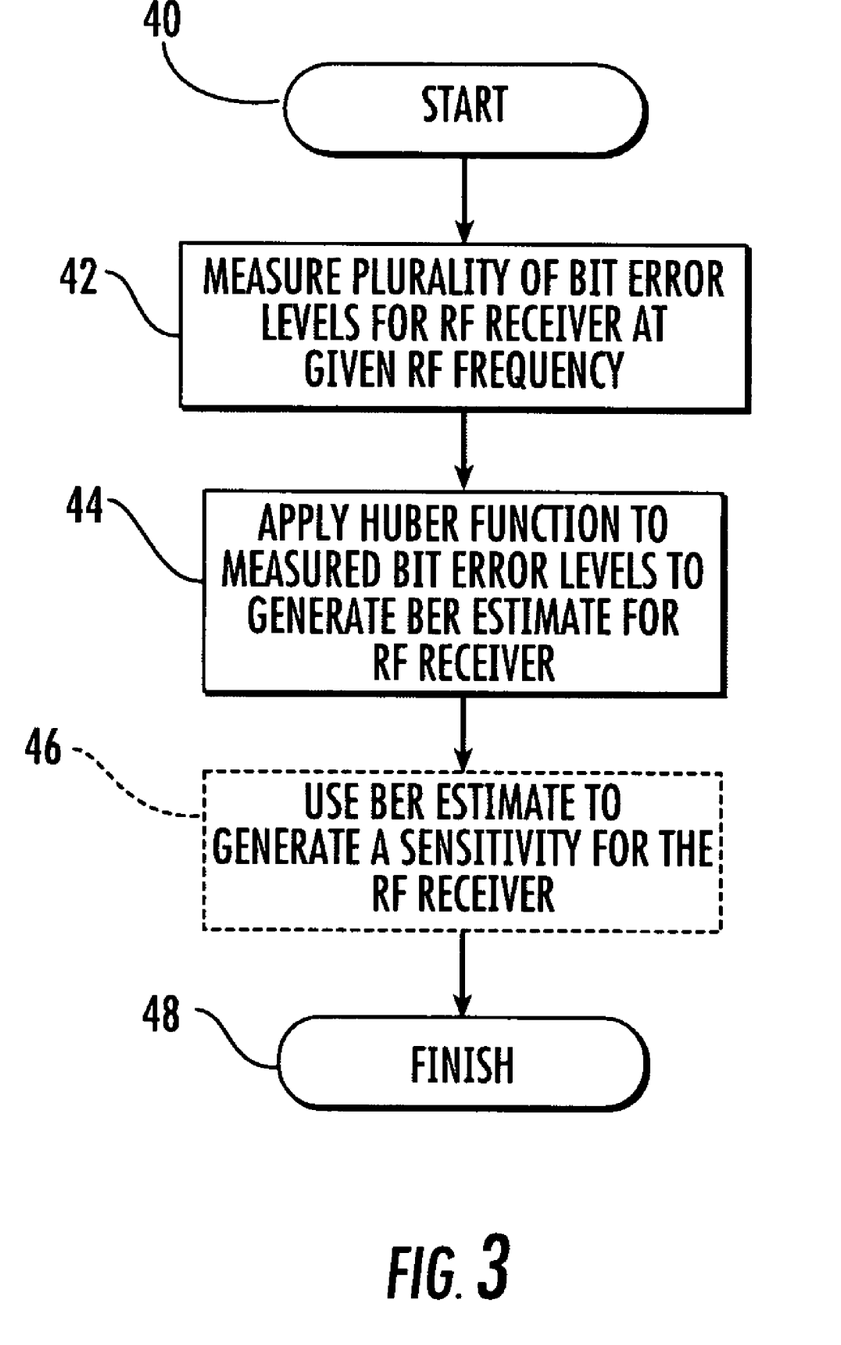
FIG. 3 is a flow diagram of a method for testing an RF receiver in accordance with one exemplary aspect.

Various method steps that may be performed by the test controller 32 will now generally be described with reference to FIG. 3. As will be appreciated by those skilled in the art, wireless communications devices such as cellular devices may operate over one or more frequency bands, each of which in turn includes numerous operating frequencies or channels. Beginning at Block 40, a plurality of bit error levels are measured for the RF receiver 32, at a given one of the RF frequencies, at Block 42. Measurement of bit error levels is well within the skill of one of ordinary skill in the art using the above-described base station emulators or other tools, and therefore requires no further discussion here.

Once the bit error levels for the given RF frequency are measured, then a Huber function is applied to the measured bit error levels to generate a bit error ratio (BER) estimate, such as residual BER (RBER) estimate, for the RF receiver, at Block 44. The BER may then optionally be used in determining an RF receiver sensitivity of the receiver 32, at Block 46, thus concluding the illustrated method (Block 48). Further details on determining receiver sensitivity based upon BER are provided in co-pending application Ser. No. 11/364,999, which is assigned to the present Assignee and is hereby incorporated herein in its entirety be reference.

As discussed above, BER fluctuates significantly in actual sensitivity measurements, which is why an average value of BER is typically used for estimating the sensitivity of the receiver. Yet, due to large spurious noise in the real communication environment and/or the radio itself, and sudden changes in the test environment, the average BER may even change significantly. The traditional average used in prior art approaches is a least square ($l_2$) method, which is vulnerable to gross errors. That is, if a few spurious data points are present, this can alter the least square average significantly. In order to make this approach more robust against gross error, an $l_1$ method is also sometimes used. However, when the data contains many small errors, the $l_1$ approach can be undesirably biased towards a subset of the data points.

A Huber function may advantageously be used in accordance with one aspect to establish a relatively smoother, less biased estimation for BER, which in turn may be used to determine radio sensitivity, as will be discussed further below. Given measured BER points $X=[x_1, x_2, \ldots, x_n]$, the BER that is the best estimation of the measured data points is $x^*$, which provides an error function of $f_i = x_i - x^*$. The Huber function is defined as:

$$\rho_k(f) = \begin{cases} f^2/2 & \text{if } |f| \le k \\ k|f| - k^2/2 & \text{if } |f| > k \end{cases} \quad (1)$$

where k is a positive constant.

The BER may be obtained by solving the following optimization:

$$F(x^*) = \sum_i^n \rho_k(f_i). \quad (2)$$

The solution for this minimization optimization is different from traditional optimization problems which are usually optimizing X. Here, the optimization is finding the value of $x^*$ that most accurately represents the BER. The optimization may be performed iteratively until a minimizer is found having an absolute value less than a given threshold or delta, as will be appreciated by those skilled in the art.

In an unbiased data set where no spurious noise is present, $x^*$ is equal to the average of all the data points. This point can be used for the initial point $x_0$ for the optimization, that is:

$$x_o = \frac{\sum_i^n x_i}{n}. \quad (3)$$

The selection of k is an important factor in finding the optimum value of $x^*$, and may advantageously help speed up the optimization process. In the present example k is chosen to be $$k = 2\sqrt{\frac{\sum_1^n (x_i - x^0)}{n-1}}. \quad (4)$$

Generally speaking, k may be in a range of about 0.8 to 1.4, although other values may be used in different embodiments.

With k determined, the data set X can be divided into three subsets, namely:

$$Q=\{x_i||x_i-x^{*(m)}|\leq k, i=1,2,\ldots,p\}$$

$$P=\{x_i|x_i<x^{*(m)}, i=1,2,\ldots,q\},$$

$$L=\{x_i|x_i>x^{*(m)}, i=1,2,\ldots,l\} \quad (5)$$

where $x^{*(m)}$ is the x* value of m iteration. Furthermore, $$x^{*(m+1)} = \frac{\sum_1^p x_j}{p} - \frac{(l-q)}{p}k. \quad (6)$$

The method convergences when $$|x^{*(n+1)}-x^{*(n)}|<\delta,$$

where δ is chosen according to the required sensitivity accuracy. The iteration converges relatively fast for the real or actual case, which makes the method very practical. It can be seen from equation (6) above that for Gaussian distributed data $x^*=x^0$.

The above-described approach is relatively robust against gross errors, as well as being relatively stable against small biased data. This approach may also lead to a more robust sensitivity determination, as well as help to speed up the measurement process. Moreover, using the above-described selection process for determining k, this may result in the exclusion of potentially noisy points. Further, the use of a closed form equation may also contribute to fast convergence optimization, as will be appreciated by those skilled in the art.

Figure 4:
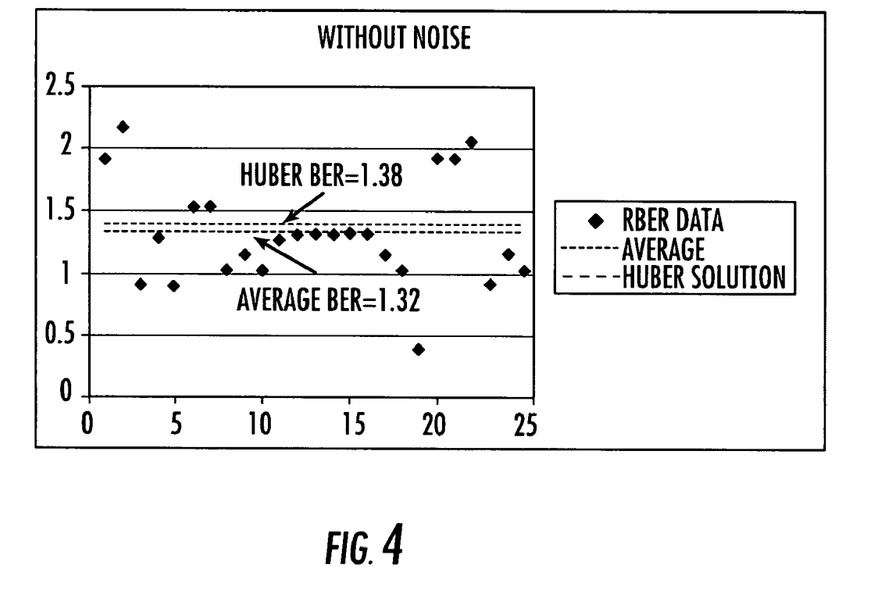
FIGS. 4-8 are graphs of bit error levels vs. sample numbers and further illustrating average BER levels and BER levels obtained using the system and methods of FIGS. 1-3.
Figure 5:
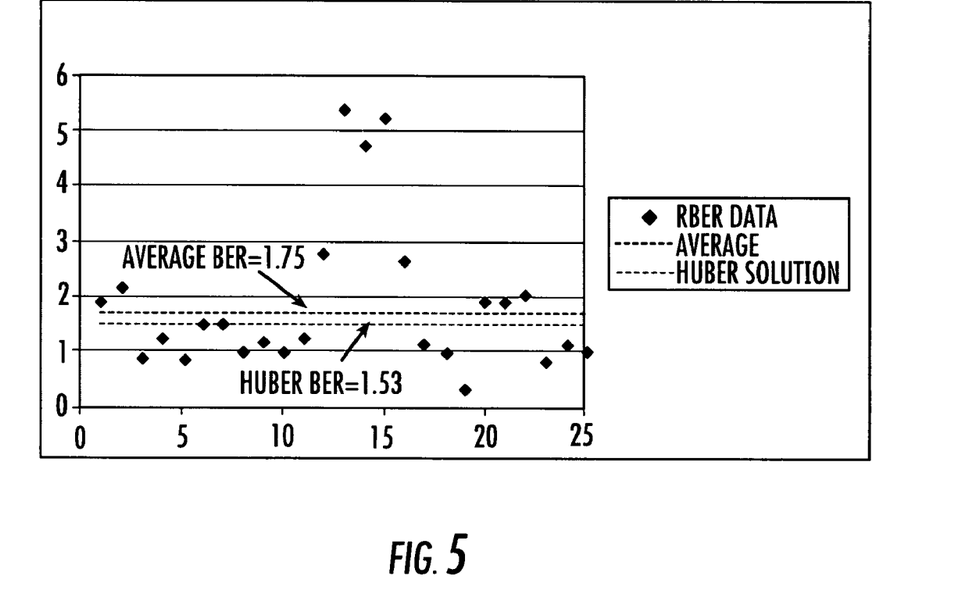

The bit error level data sets illustrated in FIGS. 4 and 5 demonstrate the difference between a traditional average method vs. the Huber approach set forth above without noise and when spurious data points are present in the data set (i.e., with noise), respectively. Sample sets of twenty-five measurements were used in both FIGS. 4 and 5.

For the present example, spurious data was caused by opening the door of a shielded test box, which would not ordinarily be done during a typical test measurement, but is provided here to show how the two approaches can significantly differ in real world scenarios where noise is present. It can be seen that the above-described Huber approach provides a BER that is close to the standard average BER in FIG. 4 without spurious data (i.e., 1.38 for Huber BER vs. 1.32 for average BER). Moreover, with noise (FIG. 5) the Huber BER is significantly more accurate than the standard average (i.e., 1.53 vs. 1.75).

Figure 6:
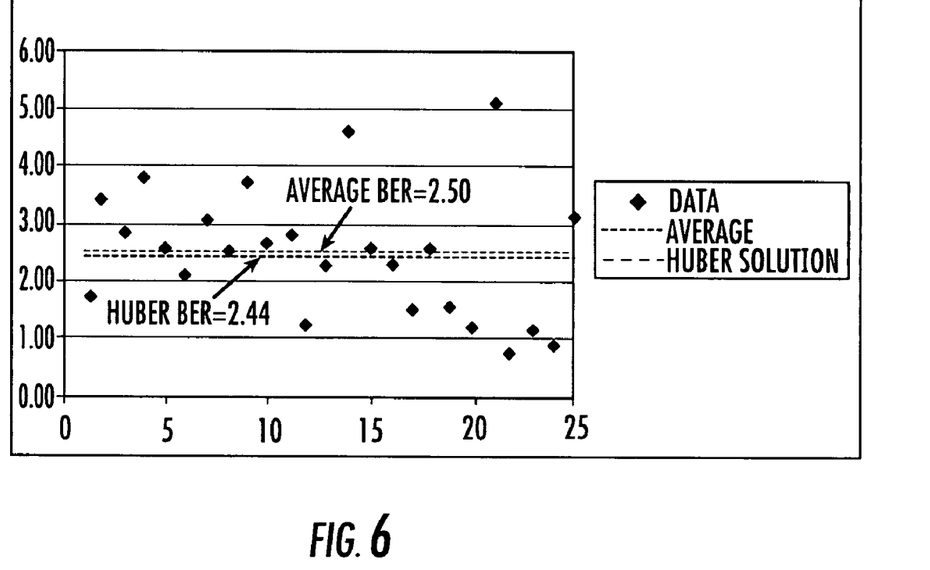
Figure 7:
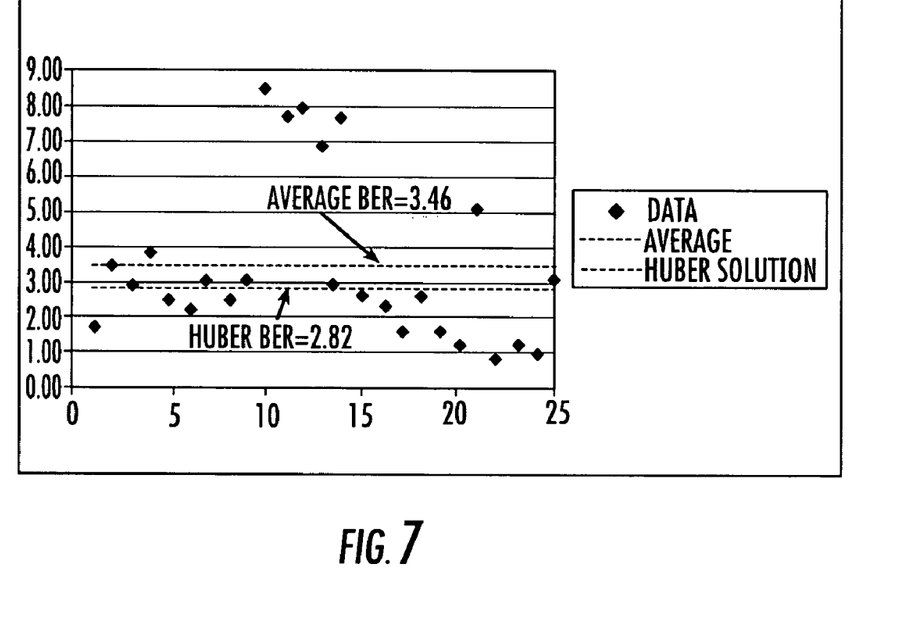

Turning now to FIGS. 6 and 7, real world data sets taken outside (i.e., not in an anechoic chamber) are shown (both of which also include twenty-five sample points) for moderate and severe noise conditions, respectively. The Huber BER was 2.44 and more accurate than the comparable average BER of 2.50 for the moderate noise environment (FIG. 6). In the severe noise environment (FIG. 7), the Huber BER was significantly more accurate, i.e., 2.82 compared to 3.46 for the average BER.

Figure 8:
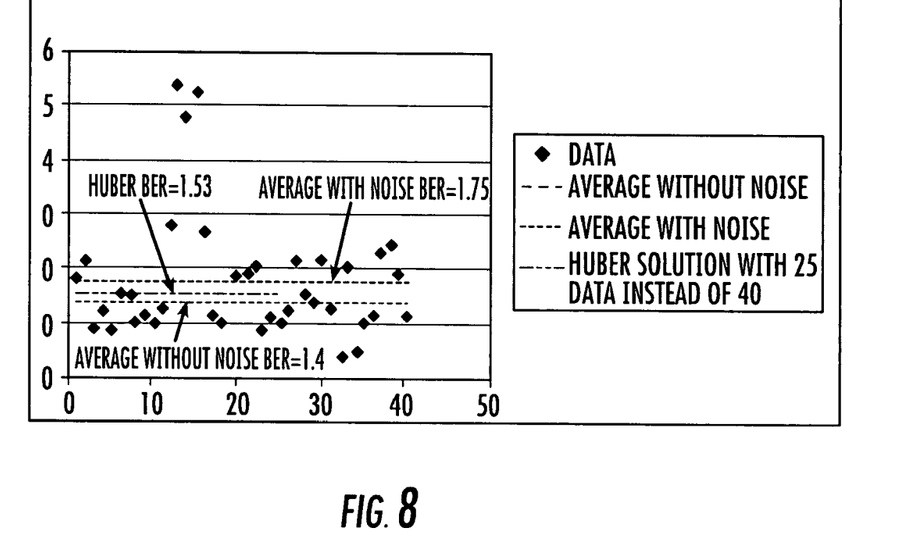

Another potential advantage of the Huber approach is that it can in some instances provide more accurate results than the standard average approach even with less data points. one such example is illustrated in FIG. 8, in which the Huber BER was determined using twenty-five of a total forty data points. As can be seen, the average with no noise using all forty data points was 1.4, and the average with noise using all forty data points was 1.75. Yet, the Huber BER with noise and only twenty-five data points was 1.53. Accordingly, the Huber BER approach may advantageously be used in certain embodiments with less samples, which reduces data sampling time and speeds up the measurements.

Exemplary components of a hand-held mobile wireless communications device 1000 that may be used in accordance the system 30 is further described in the example below with reference to FIG. 10. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 10:
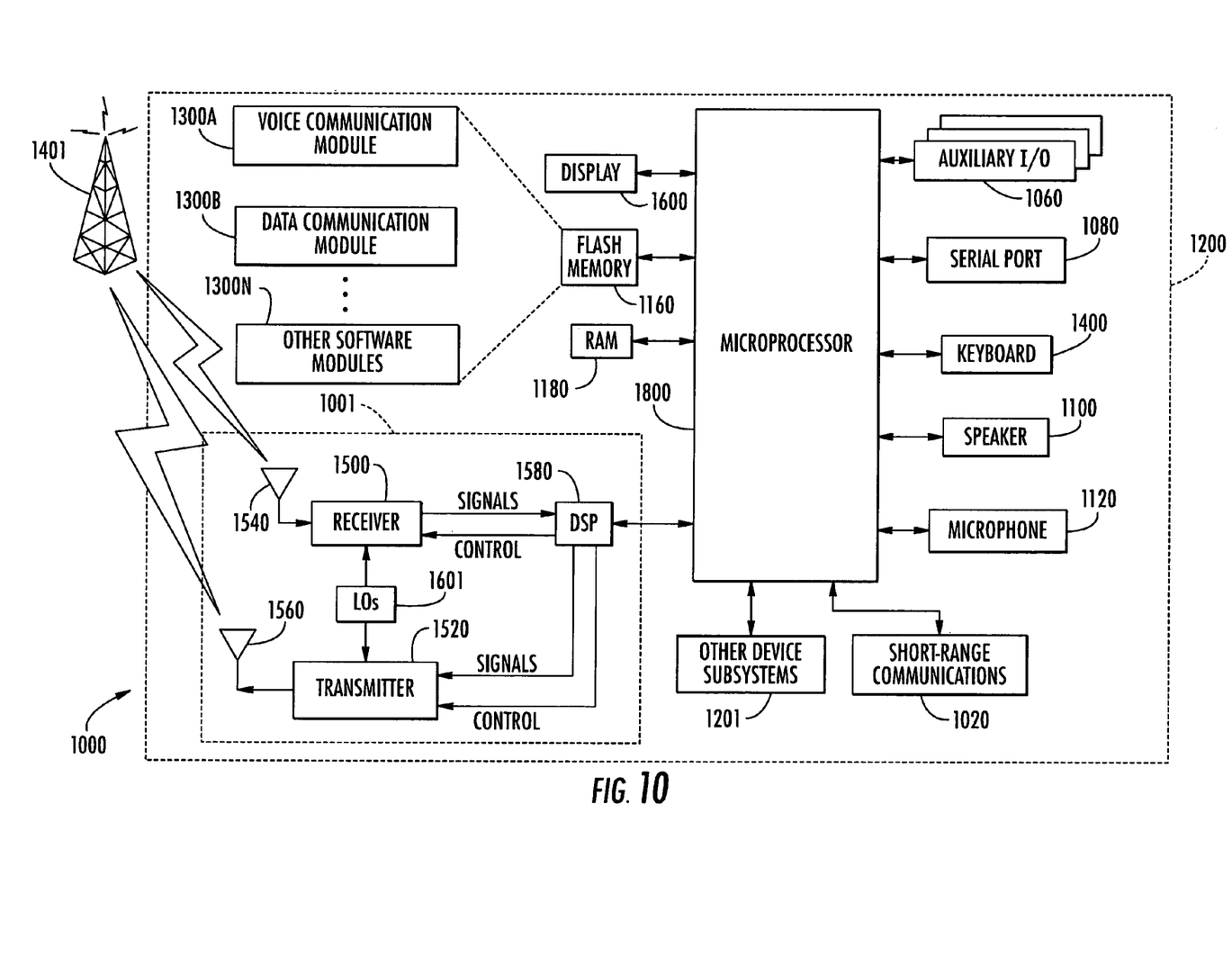
FIG. 10 is a schematic block diagram illustrating exemplary components of a mobile wireless communications device for use with the present invention.

In addition to the processing device 1800, other parts of the mobile device 1000 are shown schematically in FIG. 10. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIN card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A method for testing a cellular receiver comprising:
measuring a plurality of bit error levels for the cellular receiver at a given cellular frequency from among a plurality of different cellular frequencies;
applying a Huber function to the measured plurality of bit error levels to generate a bit error ratio (BER) estimate for the cellular receiver based upon an iteratively-determined BER minimizer to provide a given sensitivity accuracy level; and
using the BER estimate to generate a sensitivity for the cellular receiver having the given sensitivity accuracy level;
wherein the Huber function is defined as:

$$\rho_k(f) = \begin{cases} f^2/2 & \text{if } |f| \le k \\ k|f| - k^2/2 & \text{if } |f| > k \end{cases}$$

where k is a positive constant within a range of about 0.8 to 1.4.

2. The method of claim 1 wherein k is defined as:

$$k = 2\sqrt{\frac{\sum_1^n (x_i - x_0)}{n-1}},$$

where $x_0$ is an initial bit error level and n is a total number of bit error levels.

3. The method of claim 2 wherein the initial bit error level $x_0$ is defined as:

$$x_o = \frac{\sum_i^n x_i}{n}.$$

4. The method of claim 1 wherein said measuring comprises measuring the plurality of bit error levels within an anechoic RF chamber.

5. The method of claim 1 wherein said measuring comprises measuring the plurality of bit error levels in an outdoor environment.

6. The method of claim 1 wherein the BER estimate comprises a residual BER (RBER) estimate.

7. The method of claim 1 wherein the cellular receiver comprises a Global System for Mobile Communications (GSM) receiver.

8. The method of claim 1 wherein the cellular receiver comprises a General Packet Radio Service (GPRS) receiver.

9. The method of claim 1 wherein the cellular receiver comprises an Enhanced Data Rates for Global System for Mobile Communications (GSM) Evolution (EDGE) receiver.

10. A method for testing a cellular receiver comprising:
measuring a plurality of bit error levels for the cellular receiver in an outdoor environment at a given cellular frequency from among a plurality of different cellular frequencies;
applying a Huber function to the measured plurality of bit error levels to generate a residual bit error ratio (RBER) estimate for the cellular receiver based upon an iteratively-determined BER minimizer to provide a given sensitivity accuracy level; and
using the BER estimate to generate a sensitivity for the RF receiver having the given sensitivity accuracy level;
wherein the Huber function is defined as:

$$\rho_k(f) = \begin{cases} f^2/2 & \text{if } |f| \le k \\ k|f| - k^2/2 & \text{if } |f| > k \end{cases}$$

where k is a positive constant within a range of about 0.8 to 1.4.

11. The method of claim 10 wherein k is defined as:

$$k = 2\sqrt{\frac{\sum_1^n (x_i - x_0)}{n-1}},$$

where $x_0$ is an initial bit error level and n is a total number of bit error levels.

12. The method of claim 11 wherein the initial bit error level $x_0$ is defined as:

$$x_o = \frac{\sum_i^n x_i}{n}.$$

13. A test system for testing a cellular receiver comprising:
a cellular source; and
a test controller coupled to the cellular receiver configured to
measure a plurality of bit error levels for the cellular receiver based upon transmissions from the cellular source at a given cellular frequency from among a plurality of different cellular frequencies,
apply a Huber function to the measured plurality of bit error levels to generate a bit error ratio (BER) estimate for the cellular receiver based upon an iteratively-determined BER minimizer to provide a given sensitivity accuracy level, and
use the BER estimate to generate a sensitivity for the cellular receiver having the given sensitivity accuracy level;
wherein the Huber function is defined as:

$$\rho_k(f) = \begin{cases} f^2/2 & \text{if } |f| \le k \\ k|f| - k^2/2 & \text{if } |f| > k \end{cases}$$

where k is a positive constant within a range of about 0.8 to 1.4.

14. The test system of claim 13 wherein k is defined as:

$$k = 2\sqrt{\frac{\sum_1^n (x_i - x^0)}{n-1}},$$

where $x_0$ is an initial bit error level and n is a total number of bit error levels.

* * * * *